(12) United States Patent
Chistyakov et al.

(10) Patent No.: US 10,987,740 B2
(45) Date of Patent: Apr. 27, 2021

(54) CUTTING INSERT HAVING LAND WITH SPACED APART UPWARDLY BULGING LAND PORTIONS AND NON-ROTARY CUTTING TOOL PROVIDED THEREWITH

(71) Applicant: ISCAR LTD., Tefen (IL)

(72) Inventors: Sergey Chistyakov, Nahariya (IL); Ortal Alperson, Carmiel (IL)

(73) Assignee: ISCAR LTD., Tefen (IL)

( * ) Notice: Subject to any disclaimer, the term of this patent is extended or adjusted under 35 U.S.C. 154(b) by 155 days.

(21) Appl. No.: 16/238,958

(22) Filed: Jan. 3, 2019

(65) Prior Publication Data

US 2019/0262908 A1 Aug. 29, 2019

Related U.S. Application Data

(60) Provisional application No. 62/636,225, filed on Feb. 28, 2018.

(51) Int. Cl.
*B23B 29/04* (2006.01)
*B23B 27/04* (2006.01)
*B23B 27/16* (2006.01)

(52) U.S. Cl.
CPC ........ *B23B 27/1611* (2013.01); *B23B 27/045* (2013.01); *B23B 29/043* (2013.01);
(Continued)

(58) Field of Classification Search
CPC ...... B23B 2200/0471; B23B 2200/081; B23B 2200/28; B23B 2200/321; B23B 27/045; B23B 27/1611; B23B 29/043
See application file for complete search history.

(56) References Cited

U.S. PATENT DOCUMENTS 3,654,681 A * 4/1972 Stein ............... B23B 27/045
407/115
4,629,372 A * 12/1986 Huston ............. B23B 27/08
407/116
(Continued)

FOREIGN PATENT DOCUMENTS

EP 0 781 181 B1 7/1997
EP 2623236 A1 8/2013
(Continued)

OTHER PUBLICATIONS

International Search Report Application No. PCT/IL2019/050036 dated Nov. 11, 2019 (5 pages).
(Continued)

*Primary Examiner* — Nicole N Ramos
(74) *Attorney, Agent, or Firm* — Smith, Gambrell & Russell, LLP

(57) ABSTRACT

A cutting insert has a cutting portion corner formed at the intersection of a rake surface, a forward cutting portion surface and a relief surface. A cutting edge is formed at an intersection of the rake surface and the relief surface with a land that is located on the rake surface and that extends along, and negatively away from, the cutting edge. A chip-control arrangement is located at the rake surface and includes an elongated projection and plurality of spaced apart elongated protuberances that extend from the projection to the cutting edge, so that the land has a plurality of spaced apart bulging land portions. A non-rotary cutting tool has an insert holder having an insert pocket and the cutting insert releasably retained therein.

26 Claims, 7 Drawing Sheets

(52) U.S. Cl.
CPC . *B23B 2200/0471* (2013.01); *B23B 2200/081* (2013.01); *B23B 2200/28* (2013.01); *B23B 2200/321* (2013.01)

(56) References Cited

U.S. PATENT DOCUMENTS

| | | | | |
|---|---|---|---|---|
| 4,844,668 A * | 7/1989 | Pettersson | ............. | B23B 27/045 407/117 |
| 4,969,779 A * | 11/1990 | Barten | ................. | B23B 27/045 407/114 |
| 5,676,495 A * | 10/1997 | Katbi | ................... | B23B 27/045 407/114 |
| 5,725,334 A * | 3/1998 | Paya | .................... | B23B 27/045 407/104 |
| 5,951,215 A * | 9/1999 | Paya | .................... | B23B 27/141 407/113 |
| 6,135,678 A * | 10/2000 | Lundstrom | ........... | B23B 27/045 407/117 |
| 6,669,412 B1 * | 12/2003 | Hirose | ................. | B23C 5/2221 407/113 |
| 6,692,199 B2 * | 2/2004 | Andersson | ............ | B23B 27/045 407/114 |
| 6,715,968 B1 * | 4/2004 | Tagtstrom | ............. | B23B 27/045 407/116 |
| 7,320,564 B2 * | 1/2008 | Gati | ...................... | B23B 27/005 407/114 |
| 7,665,933 B2 | 2/2010 | Nagaya et al. | | |
| 7,883,300 B1 * | 2/2011 | Simpson, III | ......... | B23B 27/045 407/115 |
| 8,770,895 B2 * | 7/2014 | Inoue | .................... | B23B 27/045 407/115 |
| 8,939,684 B2 | 1/2015 | Chistyakov | | |
| 9,168,588 B2 | 10/2015 | Kaufmann et al. | | |
| 9,579,727 B2 | 2/2017 | Kaufmann et al. | | |
| 2003/0170081 A1 * | 9/2003 | Andersson | ............ | B23B 27/045 407/116 |
| 2013/0192431 A1 | 8/2013 | Inoue | | |
| 2014/0290450 A1 | 10/2014 | Fujii et al. | | |
| 2016/0207115 A1 * | 7/2016 | Ikenaga | ................ | B23B 27/045 |
| 2017/0100778 A1 | 4/2017 | Lof et al. | | |

FOREIGN PATENT DOCUMENTS

| | | |
|---|---|---|
| EP | 2682208 A1 | 1/2014 |
| EP | 3153261 A1 | 4/2017 |
| WO | 96/08330 | 3/1996 |
| WO | 2019/167037 A1 | 9/2019 |

OTHER PUBLICATIONS

Written Opinion International Search Authority Application No. PCT/IL2019/050036 dated Nov. 11, 2019 (5 pages).

* cited by examiner

CUTTING INSERT HAVING LAND WITH SPACED APART UPWARDLY BULGING LAND PORTIONS AND NON-ROTARY CUTTING TOOL PROVIDED THEREWITH

RELATED APPLICATIONS

This application claims priority from U.S. Provisional Patent Application No. 62/636,225, filed 28 Feb. 2018, the contents of which are incorporated by reference in their entirety.

FIELD OF THE INVENTION

The subject matter of the present application relates to a chip-control arrangement for a cutting insert. Such arrangement can be formed on a cutting insert configured for, inter alia, turning cutting operations.

BACKGROUND OF THE INVENTION

Cutting inserts can be provided with a chip-control arrangement for controlling the flow of and/or controlling the shape and size of the swarf and debris resulting from metalworking operations.

Such chip-control arrangements usually include recesses and/or projections located near a cutting edge of the insert. Upon encountering the recesses and/or projections, metal chips can be created with specific shapes and the chips can then be evacuated therefrom.

Various chip-control arrangements for grooving cutting operations are disclosed in U.S. Pat. Nos. 7,665,933, 9,168,588, 9,579,727 and EP 0781181.

SUMMARY OF THE INVENTION

In accordance with a first aspect of the subject matter of the present application there is provided a cutting insert comprising:
  a cutting portion, having a cutting portion major axis defining opposite forward to rearward directions and a cutting portion lateral axis, oriented perpendicular to the cutting portion major axis in a top view of the cutting portion, defining a feed direction, the cutting portion comprising:
    a cutting portion corner formed at the intersection of an upward facing rake surface, a forward facing forward cutting portion surface and a relief surface facing in the feed direction;
    a cutting edge formed at an intersection of the rake surface and the relief surface;
    a land located on the rake surface and extending along, and negatively away from, the cutting edge; and
    a chip-control arrangement at the rake surface comprising:
      an elongated projection projecting from the rake surface, spaced apart from the land, and extending in a direction from a rearward portion towards a forward portion of the cutting portion; and
      a plurality of elongated protuberances projecting from the rake surface and being spaced apart from each other and the forward cutting portion surface, each protuberance extending from the projection to the cutting edge, so that the land comprises a plurality of spaced apart upwardly bulging land portions.

In accordance with a second aspect of the subject matter of the present application there is provided a non-rotary cutting tool, comprising:
  a cutting insert of the type described above; and
  an insert holder comprising an insert pocket; wherein the cutting insert is releasably retained in the insert pocket.

It is understood that the above-said is a summary, and that features described hereinafter may be applicable in any combination to the subject matter of the present application, for example, any of the following features may be applicable to the cutting insert and/or the cutting tool:

Each pair of adjacent bulging land portions can be spaced apart by a non-bulging land portion. The land inclination angle at the cutting edge at each of the bulging land portions forms a bulging land inclination angle. The land inclination angle at the cutting edge at each of the non-bulging land portions forms a non-bulging land inclination angle. The bulging land inclination angle can be greater at any given bulging land portion than the non-bulging land inclination angles at its adjacent non-bulging land portions.

The bulging land inclination angle at any given bulging land portion is greater than the non-bulging land inclination angles at its adjacent non-bulging land portions by no more than 5°.

The bulging land inclination angles can follow a pattern of increasing value in direction away from the forward cutting portion surface.

The bulging land inclination angle can be greater than or equal to 20° and less than or equal to 40°.

The non-bulging land inclination angle can be greater or equal to 5° and less than or equal to 30°.

The plurality of protuberances may not be not identical.

In a transverse feed plane perpendicular to the cutting portion lateral axis and intersecting the plurality of protuberances, the plurality of protuberances can follow a pattern of increasing height in a rearward direction away from the forward cutting portion surface.

The projection can be spaced apart from the land by a chip forming groove that undulates in the rearward direction away from the forward cutting portion surface.

The projection can increase in distance from the cutting edge with increasing distance from the forward cutting portion surface.

A forwardmost portion of the projection can extend in a direction towards the cutting portion corner.

A rearmost portion of the projection can extend longitudinally along a projection longitudinal axis. In a top view of the cutting portion, the projection longitudinal axis forms a projection angle with the cutting portion major axis. The projection angle can be greater or equal to 5° and less than or equal to 15°.

The projection can comprise two projection flank surfaces and a central disposed projection ridge surface that extends therebetween in a widthwise direction of the projection, the projection ridge surface being higher than the two projection flank surfaces in a widthwise cross-section.

In a top view of the cutting portion, the projection ridge surface can be located between the cutting portion major axis and the cutting edge.

In a top view of the cutting portion, the projection ridge surface transitions from being closer to the cutting edge than to the cutting portion major axis, to being closer to the cutting portion major axis than to the cutting edge, as the projection ridge surface extends in the rearward direction.

The projection ridge surface can comprise a plurality of projection crest portions and a at least one projection trough portion, each adjacent pair of projection crest portions being spaced apart by a respective projection trough portion, and each projection crest portion being higher than its adjacent projection trough portions. Each protuberance can extend from a respective one of the projection crest portions.

The plurality of projection crest portions can follow a pattern of increasing height in a rearward direction away from the forward cutting portion surface.

The plurality of projection crest portions can be located above the cutting edge as measured in the upward direction.

Each protuberance can extend along a protuberance longitudinal axis. In a top view of the cutting portion, each protuberance longitudinal axis forms a protuberance angle with the cutting portion lateral axis. The protuberance angle can be greater than or equal to 0° and less than or equal to 30°.

In a top view of the cutting portion, the protuberance longitudinal axes can be parallel with each other.

In a cross-sectional view taken in a protuberance axial plane containing one of the protuberance longitudinal axes and intersecting the rake and relief surfaces, a central portion of the protuberance can have a concave profile.

In a cross-sectional view taken in a protuberance radial plane perpendicular to one of the protuberance longitudinal axis and intersecting the protuberance, a central portion of the protuberance can have a convex profile.

In a top view of the cutting portion, the cutting edge can be straight.

In a side view of the cutting portion, the cutting edge can be non-straight.

In a side view of the cutting portion, the cutting edge can have a wavy profile, formed by a plurality of cutting edge crests and at least one cutting edge trough, each cutting edge crest being formed at a respective one of the bulging land portions.

The land can comprise a convexly curved land portion extending in the direction of the cutting edge and that is convexly curved in direction away from the cutting edge.

The convexly curved land portion can be spaced apart from the cutting edge.

The convexly curved land portion can be defined by a convexly curved land radius that can vary along the cutting edge.

The cutting portion lateral axis can define a second feed direction, opposite the feed direction, the cutting portion can further comprise:
- a second cutting portion corner formed at the intersection of the rake surface, the forward cutting portion surface and a second relief surface that faces in the second feed direction;
- a second cutting edge formed at an intersection of the rake surface and the second relief surface;
- a second land located on the rake surface and extending along, and negatively away from, the second cutting edge; wherein
  the chip-control arrangement can further comprise:
    an elongated second projection projecting from the rake surface, spaced apart from the second land, and extending in a direction towards forward portion of the cutting portion; and
    a plurality of elongated second protuberances projecting from the rake surface and being spaced apart from each other and the forward cutting portion surface, each second protuberance extending from the second projection to the second cutting edge, so that the second land comprises a plurality of spaced apart second bulging land portions.

The cutting portion can further comprise a forward cutting edge formed at an intersection of the rake surface and the forward cutting portion surface, wherein in a top view of the cutting portion, the forward cutting edge has a forward cutting edge length which also defines a maximum width dimension of the cutting insert in a direction perpendicular to the cutting portion major axis.

The chip-control arrangement can exhibit mirror symmetry about a symmetry plane that contains the cutting portion major axis and a cutting portion vertical axis which is perpendicular to the cutting portion major axis and which extends between the relief surface and the second relief surface.

BRIEF DESCRIPTION OF THE FIGURES

For a better understanding of the present application and to show how the same may be carried out in practice, reference will now be made to the accompanying drawings, in which.

Figure 1:
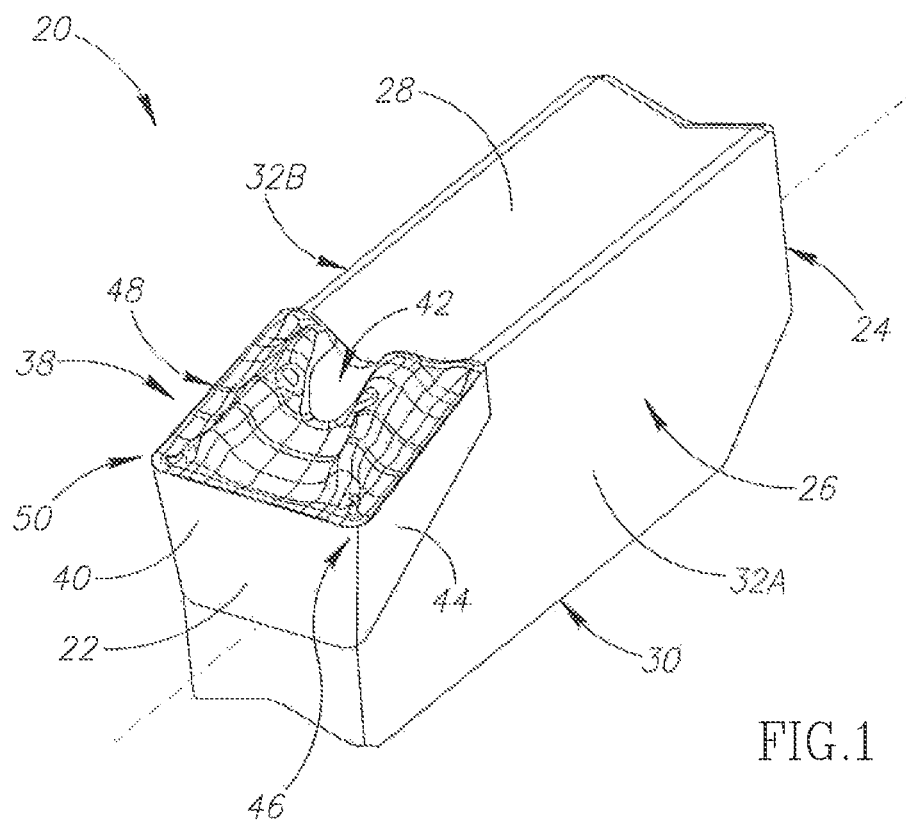
FIG. 1 is a perspective view of a cutting insert in accordance with a first embodiment of the present application.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1, showing a cutting insert 20, in accordance with a first embodiment of the present application. The cutting insert 20 can be typically made from cemented carbide and can be coated with a wear-resistant material. In this non-limiting example shown in the drawings, the cutting insert 20 includes opposing insert front and rear surfaces 22, 24 and an insert peripheral surface 26 that extends between the insert front and rear surfaces 22, 24. The insert peripheral surface 26 extends about an insert central axis I. The insert central axis I can be a longitudinal axis so that the cutting insert 20 is elongated. The insert central axis I intersects the insert front and rear surfaces 22, 24. The insert peripheral surface 26 includes opposing insert top and bottom surfaces 28, 30 that connect the insert front and rear surfaces 22, 24. The insert peripheral surface 26 further includes two opposing insert side surfaces, a first insert side surface 32A and a second insert side surface 32B that connect the insert front and rear surfaces 22, 24 and the insert top and bottom surfaces 28, 30. It is also noticed that, in this non-limiting example, the cutting insert 20 is configured to be resiliently clamped in an insert pocket 34 (FIG. 13) of an insert holder 36 and is thus formed without a clamping hole for receiving a clamping member (such as a retaining screw) therethrough.

Figure 2:
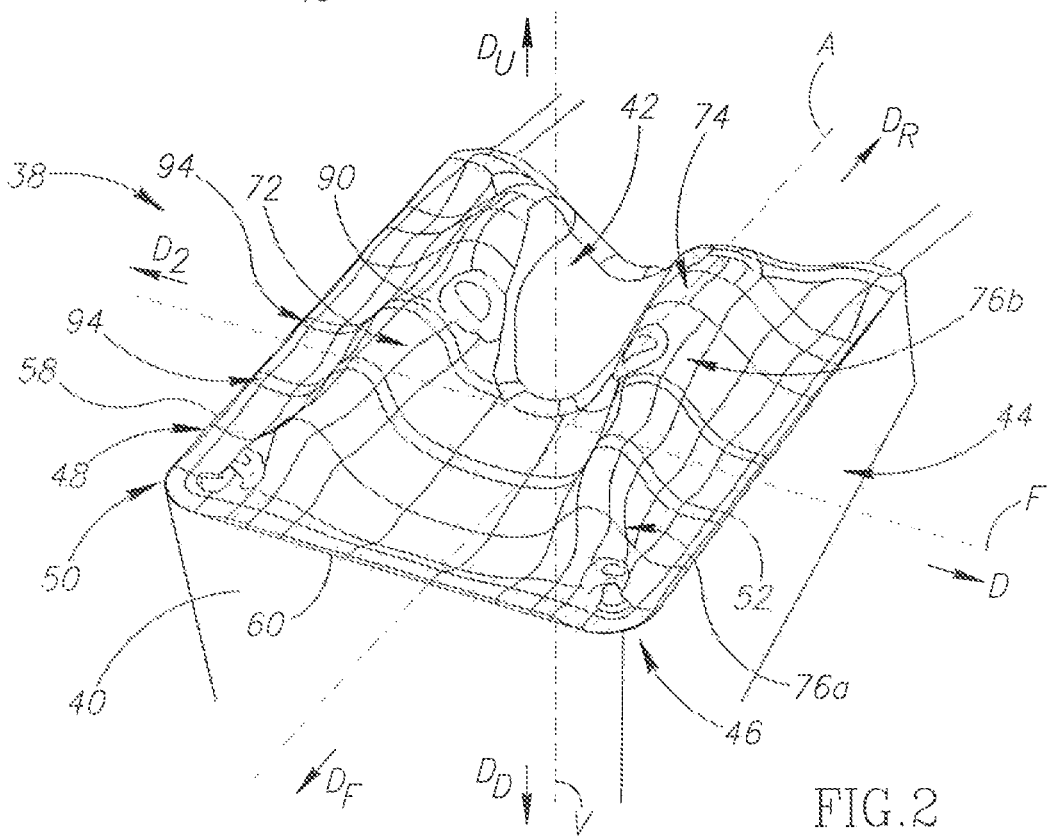
FIG. 2 is a detail of FIG. 1, showing a cutting portion.

Referring to FIG. 2, the cutting insert 20 includes a cutting portion 38, for providing metal removing ability to the cutting insert 20. In this non-limiting example shown in the drawings, the cutting insert 20 has just one cutting portion 38, located at one end of the cutting insert 20. However, it is understood that there could be two cutting portions 38 (e.g. at each end when the cutting insert 20 is double-ended), or more cutting portions 38, as disclosed in, for example, U.S. Pat. No. 8,939,684 B2.

Referring to FIGS. 2, 3, 4 and 6a, the cutting portion 38 has three mutually perpendicular axes, a cutting portion major axis A, a cutting portion vertical axis V and a cutting portion lateral axis F. The cutting portion major axis A defines a forward to rearward direction $D_F$, $D_R$. In accordance with some embodiments of the subject matter of the present application, in a top view of the cutting portion 38 viewed along the cutting portion vertical axis V, the cutting portion major axis A can be parallel to, and aligned with, the insert central axis I. However, as seen in a side view of the cutting portion 38 viewed along the cutting portion lateral axis F (i.e. FIG. 3), the cutting portion major axis A and the insert central axis I can extend transversely to one another. The cutting portion vertical axis V defines an upward to downward direction $D_U$, $D_D$. The cutting portion lateral axis F defines at least a feed direction D. In accordance with some embodiments of the subject matter of the present application, the cutting portion lateral axis F can also define a second feed direction $D_2$, opposite the feed direction D. The cutting portion 38 has a symmetry plane S that contains the cutting portion major axis A and the cutting portion vertical axis V.

Figure 3:
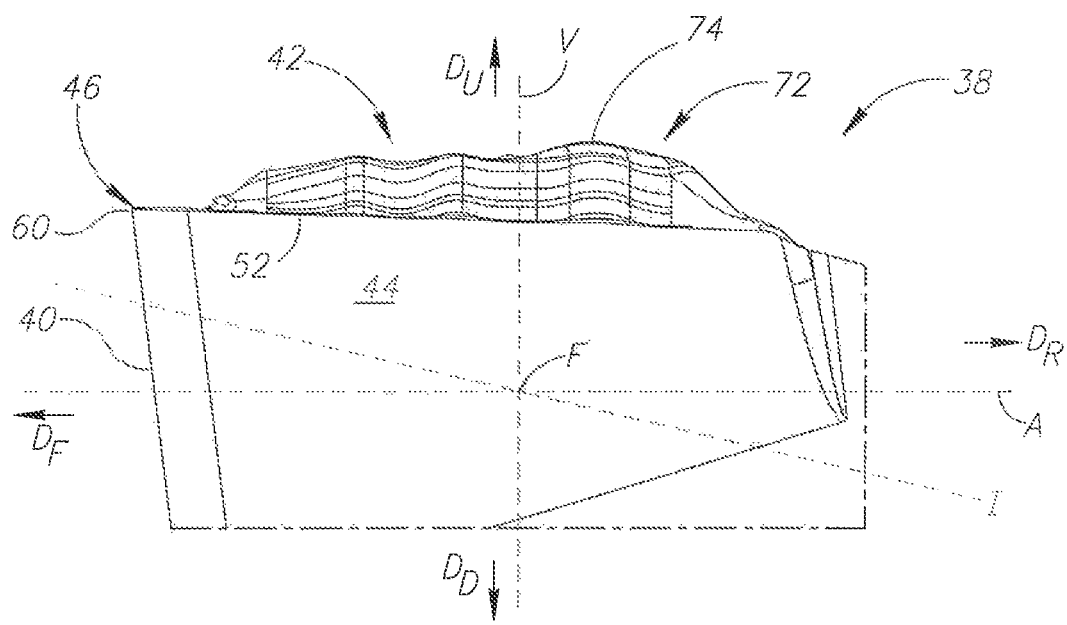
FIG. 3 is a side view of the cutting portion in FIG. 2.
Figure 6A:
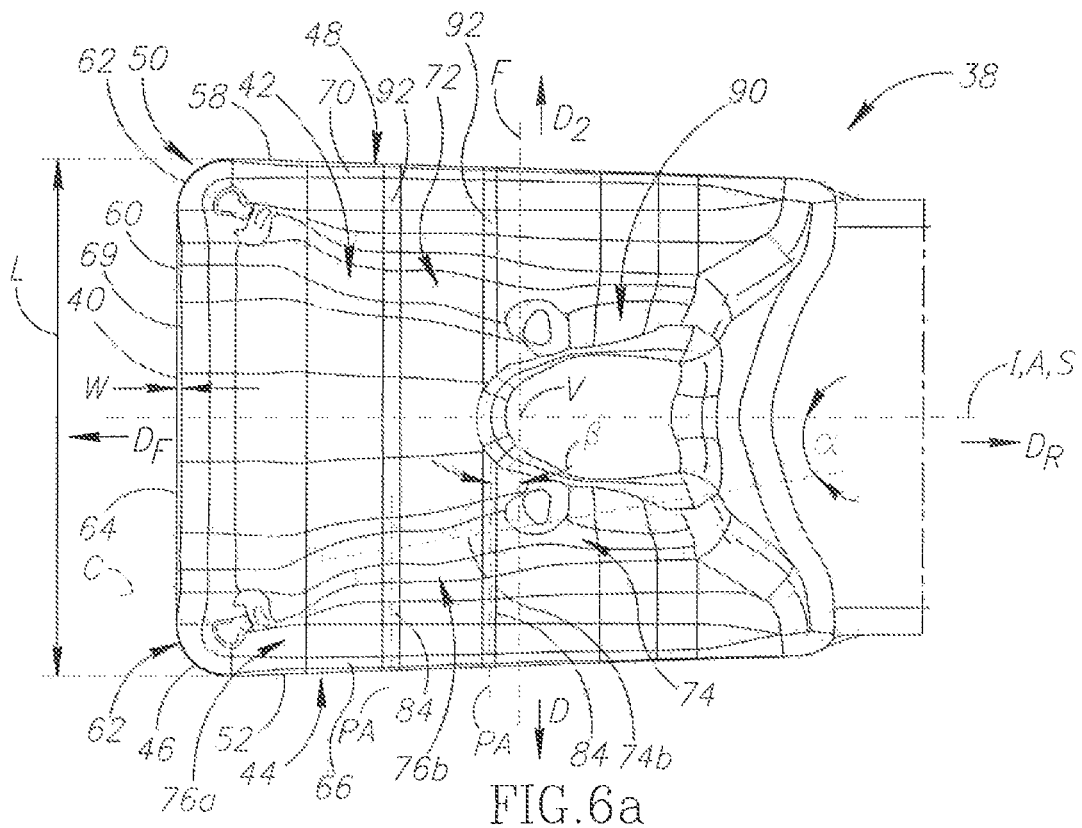
FIG. 6a is a top view of the cutting portion in FIG. 2.

It should be appreciated that use of the terms "forward" and "rearward" throughout the description and claims refer to a relative position in a direction of the cutting portion major axis A, towards the left ($D_F$) and right ($D_R$), respectively, in FIGS. 3 and 6a. Likewise, it should be appreciated that use of the terms "upward" and "downward" throughout the description and claims refer to a relative position in a direction parallel to the cutting portion vertical axis V, upwards and downwards, respectively, in FIGS. 3 and 4. Finally, it should be appreciated that use of the terms "feed direction" and "second feed direction" throughout the description and claims refer to a relative position in a direction parallel to the cutting portion lateral axis F, towards the right and left, respectively, in FIG. 4.

The cutting portion 38 includes a forward cutting portion surface 40 formed on the insert front surface 22. The forward cutting portion surface 40 is intersected by the cutting portion major axis A and faces in the forward direction $D_F$.

The cutting portion 38 includes a rake surface 42 formed on the insert top surface 28. The rake surface 42 is intersected by the cutting portion vertical axis V and faces in the upward direction $D_U$.

The cutting portion 38 also includes a relief surface 44 formed on the first insert side surface 32A. The relief surface 44 is intersected by the cutting portion lateral axis F and faces in the feed direction D. In accordance with some embodiments of the subject matter of the present application, the cutting portion 38 can include a second relief surface 48 formed on the second side surface 32B. The second relief surface 48 can be intersected by the cutting portion lateral axis F and faces in the second feed direction $D_2$. The cutting portion vertical axis V extends between the relief surface 44 and the second relief surface 48. Thus, the symmetry plane S is positioned between the relief surface 44 and the second relief surface 48.

A cutting portion corner 46 is formed at the intersection of the rake surface 42, the forward cutting portion surface 40, the relief surface 44. In accordance with some embodiments of the subject matter of the present application, a second cutting portion corner 50 can be formed at the intersection of the rake surface 42, the forward cutting portion surface 40 and the second relief surface 48.

Figure 3A:
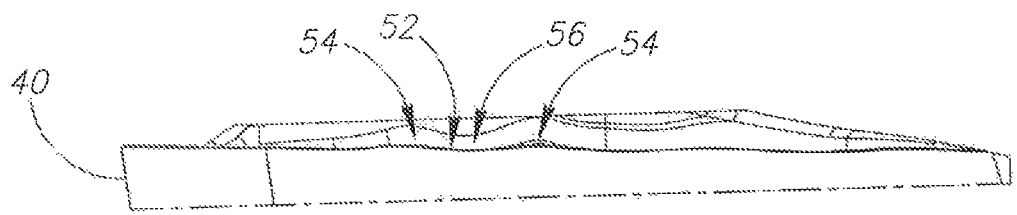
FIG. 3a is a detail of FIG. 3.

The cutting portion 38 includes a cutting edge 52 formed at the intersection of the rake surface 42 and the relief surface 44. Referring to FIG. 6a, in accordance with some embodiments of the subject matter of the present application, in a top view of the cutting portion 38, the cutting edge 52 can be straight. Referring to FIG. 3a, in a side view of the cutting portion 38, the cutting edge 52 can be non-straight. Preferably, in such a view, the cutting edge 52 can have a wavy profile, formed by a plurality of cutting edge crests 54 and at least one cutting edge trough 56 that alternate with each other along the cutting edge 52.

Reverting to FIG. 6a, in accordance with some embodiments of the subject matter of the present application, the cutting portion 38 can also include a second cutting edge 58 formed at the intersection of the rake surface 42 and the second relief surface 48. In a top view of the cutting portion 38, the second cutting edge 58 can be straight but not parallel with the cutting edge 52.

Figure 4:
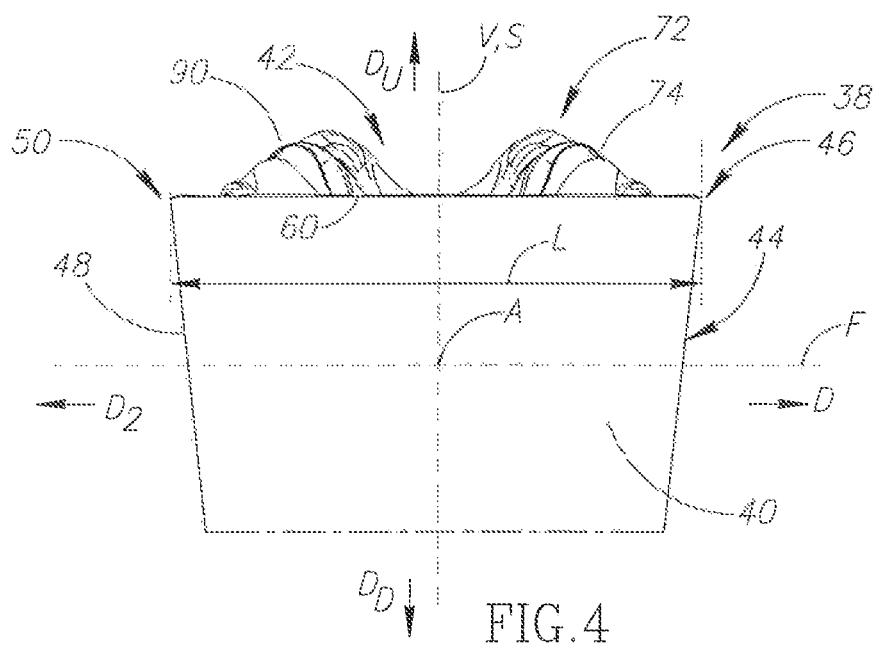
FIG. 4 is a front view of the cutting portion in FIG. 2.

In accordance with some embodiments of the subject matter of the present application, the cutting portion 38 can include a forward cutting edge 60 formed at an intersection of the rake surface 42 and the forward cutting portion surface 40. The forward cutting edge 60 can thus serve as a relief surface. As shown in FIGS. 4 and 6a, the forward cutting edge 60 has a forward cutting edge length L, measured in the direction of the cutting portion lateral axis F. In the top view of the cutting portion 38, the forward cutting edge length L defines the width of the groove cut in the work piece, and also establishes the maximum width of the cutting portion 38. In accordance with some embodiments of the subject matter of the present application, the forward cutting edge 60 can include two curved forward corner cutting edges 62 and a forward intermediate cutting edge 64 that extends between the two forward corner cutting edges 62. The forward corner cutting edges 62 can be formed at the cutting portion corner 46 and the second cutting portion corner 50, respectively. The forward intermediate cutting edge 64 can be longer than each of the two forward corner cutting edges 62. In the top view of the cutting portion 38, the forward intermediate cutting edge 64 can be straight. The forward cutting edge 60 can be mirror symmetrical about an imaginary longitudinal plane which contains the cutting portion major axis A and passes through the insert top and bottom surfaces 28, 30. Thus, the cutting portion major axis A may bisect the forward cutting edge 60, in a top view of the cutting portion 38 (i.e. in a view in front of the rake surface 42 viewed along the cutting portion vertical axis V). The cutting edge 52 and second cutting edge 58 can merge with the forward cutting edge 60 at opposite ends thereof.

Figure 5:
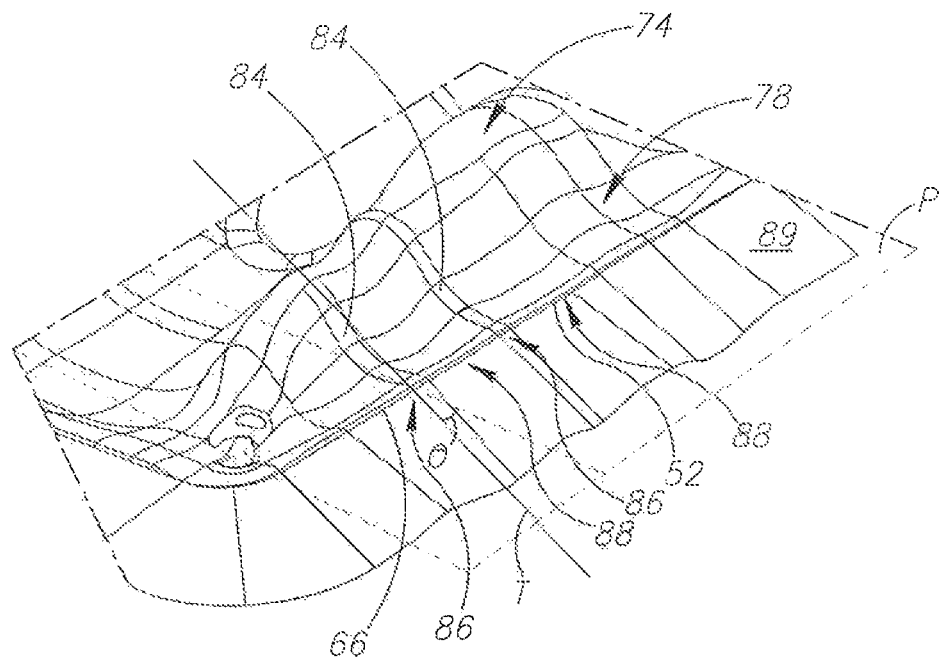
FIG. 5 is a fragmentary perspective view of the cutting portion in FIG. 1, showing an undulating chip forming groove and imaginary extrapolated land surface.

The rake surface 42 includes a land 66. The land 66 acts to strengthen the cutting edge 52. The land 66 is adjacent the cutting edge 52. The land 66 extends along the cutting edge 52. Referring to FIG. 5, any point on the land 66 has a land inclination angle $\theta$ defined by a tangent line T and a rake plane P, where the tangent line T is perpendicular to the cutting edge 52 in a top view of the cutting portion 38 and tangentially touches the land 66, and the rake plane P is oriented perpendicular to the cutting portion vertical axis V. The land 66 extends negatively away from the cutting edge 52. That is to say, the land 66 slopes upwardly from the cutting edge 52 so that the land inclination angle $\theta$ is greater than 0°.

In accordance with some embodiments of the subject matter of the present application, the rake surface 42 can include a forward land 69. The forward land 69 can be adjacent the forward cutting edge 60. The forward land 69 can extend along, and negatively away from, the forward cutting edge 60. Referring to FIG. 6a, the forward land 69 has a forward land width W that can vary. Preferably, the forward land width W at the forward intermediate cutting edge 64 can be greater than the forward land width W at the forward cutting corner cutting edges 62.

In accordance with some embodiments of the subject matter of the present application, the rake surface 42 can include a second land 70. The second land 70 can be adjacent the second cutting edge 58. The second land 70 can extend along, and negatively away from, the second cutting edge 58.

The cutting portion 38 includes a chip-control arrangement 72 at the rake surface 42. It is understood that the cutting insert 20 in accordance with the subject matter of the present application could comprise one or more cutting portions 38 with such a chip-control arrangement 72 and one or more other cutting portions 38 which are devoid of any chip-control arrangement or which are formed with a different chip-control arrangement. The chip-control arrangement 72 is intended to control the flow and/or the shape and size of the swarf and debris resulting from metalworking operations.

Referring to FIGS. 1-6a, the chip-control arrangement 72 includes an elongated projection 74. The projection 74 serves to curve the chip in the feed direction D. The projection 74 projects from the rake surface 42. The projection 74 is spaced apart from the land 66. As shown in FIG. 5, in accordance with some embodiments of the subject matter of the present application, the projection 74 can be spaced apart from the land 66 by a chip forming groove 78 that undulates in the rearward direction $D_R$ away from the forward cutting portion surface 40 (see also FIG. 7).

The projection 74 extends in a direction from a rearward portion of the cutting portion 38 towards a forward portion of the cutting portion 38. In accordance with some embodiments of the subject matter of the present application, the projection 74 can include a forwardmost portion 76a and a rearmost portion 76b that merge with each other. The rearmost portion 76b of the projection 74 can form a majority of the length of the projection 74 (e.g. more than half the length of the projection 74).

The forwardmost portion 76a of the projection 74 can extend in a direction towards the cutting portion corner 46. The rearmost portion 76b of the projection 74 can extend in a direction different than that of the forwardmost portion 76a of the projection 74. The rearmost portion 76b of the projection 74 can extend in a direction towards the forward cutting portion surface 40. The projection 74 can increase in distance from the cutting edge 52 with increasing distance from the forward cutting portion surface 40. The rearmost portion 76b of the projection 74 can extend longitudinally along a projection longitudinal axis C. In a top view of the cutting portion 38, the projection longitudinal axis C can form a projection angle $\alpha$ with the cutting portion major axis A. The projection angle $\alpha$ can be in the range, $5° \leq \alpha \leq 15°$. The projection longitudinal axis C can intersect the forward cutting edge 60. Preferably, the projection longitudinal axis C can intersect the forward intermediate cutting edge 64.

Figure 10:
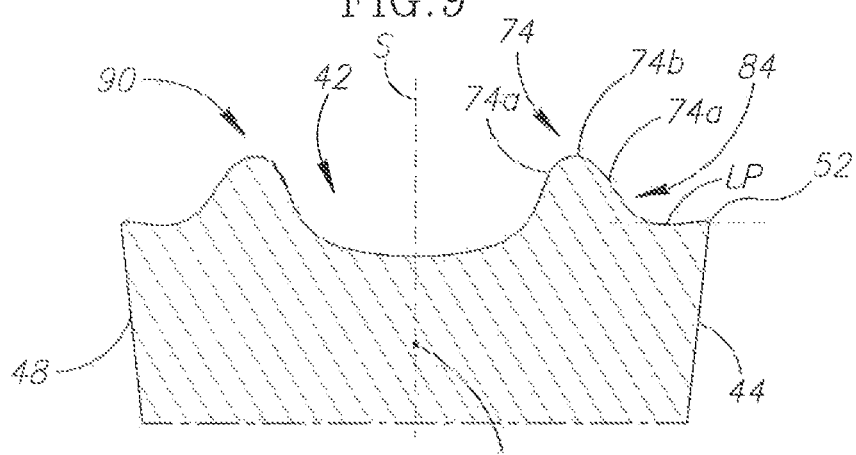
FIG. 10 is a fragmentary cross section view taken along line X-X in FIG. 6b.
Figure 11:
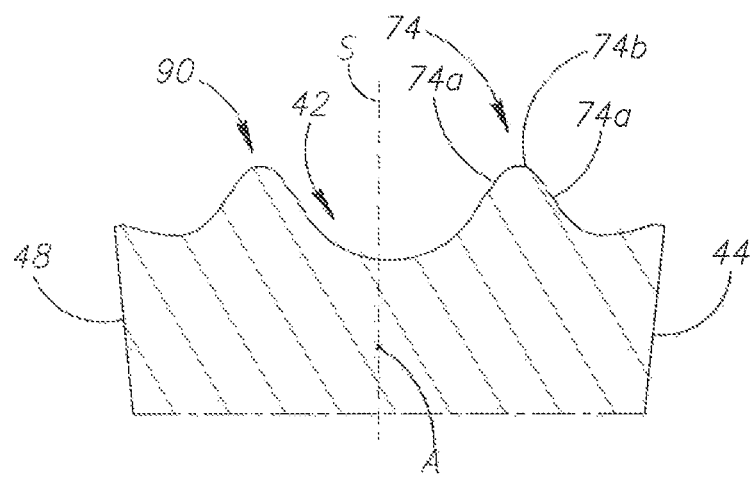
FIG. 11 is a fragmentary cross section view taken along line XI-XI in FIG. 6b.

As seen in FIGS. 10 and 11, in accordance with some embodiments of the subject matter of the present application, the projection 74 can include two projection flank surfaces 74a and a central projection ridge surface 74b that extends therebetween in a widthwise direction of the projection 74. The projection ridge surface 74b can be higher than the two projection flank surfaces 74a in a widthwise cross-section. The central projection ridge surface 74b at the rearmost portion 76b of the projection 74 can extend along the projection longitudinal axis C (as seen in a top view of the cutting portion 38, i.e. FIG. 6a). In the same view, the projection ridge surface 74b can transition from being closer to the cutting edge 52 than to the cutting portion major axis A, to being closer to the cutting portion major axis A than to the cutting edge 52, as the projection ridge surface 74b extends in the rearward direction $D_R$.

Figure 8:
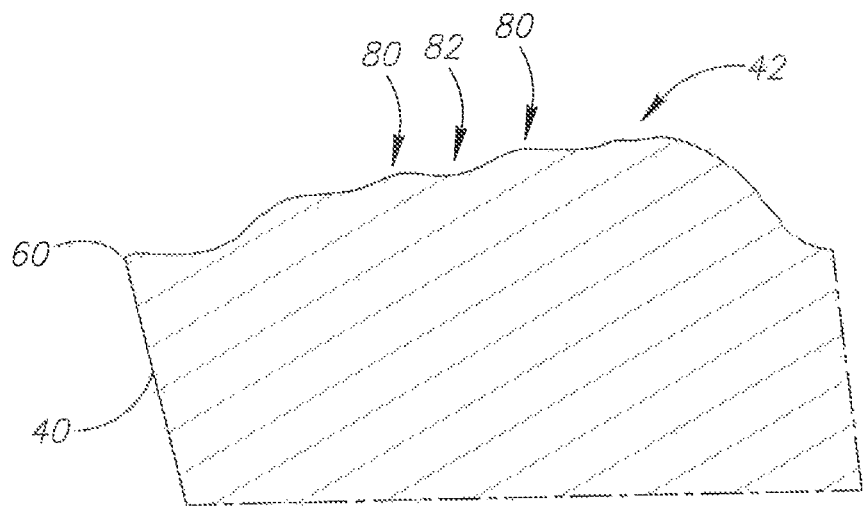
FIG. 8 is a fragmentary cross section view taken along line VIII-VIII in FIG. 6b.

Referring to FIG. 8, showing a cross-sectional view taken in a plane containing the projection longitudinal axis C, in accordance with some embodiments of the subject matter of the present application, the projection ridge 74b can include a plurality of projection crest portions 80 and at least one projection trough portions 82, each pair of adjacent projection crest portions 80 being spaced apart by a respective projection trough portion 82. Each projection crest portion 80 is higher than its adjacent projection trough portions 82.

In accordance with some embodiments of the subject matter of the present application, the plurality of projection crest portions 80 can be located above the cutting edge 52 as measured in an upward direction $D_U$. The plurality of projection crest portions 80 can follow a pattern of increasing height in a rearward direction $D_R$ away from the forward cutting portion surface 40. The at least one projection trough portion 82 can be located above the cutting edge 52 as measured in an upward direction $D_U$.

Figure 9:
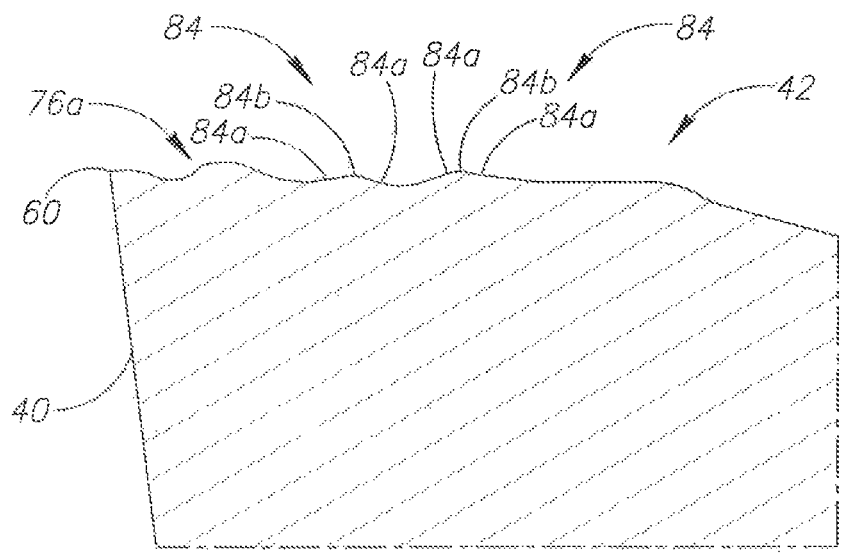
FIG. 9 is a fragmentary cross section view taken along line IX-IX in FIG. 6b.

Referring to FIGS. 1-6a, the chip-control arrangement 72 includes a plurality of elongated protuberances 84. The plurality of protuberances 84 serve to curve the chip in the direction of the cutting portion major axis A. The plurality of protuberances 84 project from the rake surface 42. The plurality of protuberances 84 are spaced apart from each other and the forward cutting portion surface 40. In accordance with some embodiments of the subject matter of the present application, each protuberance 84 can extend from a respective one of the projection crest portions 80. The plurality of protuberances 84 may not be identical. Reference is made to FIG. 9, showing a cross-sectional view in a transverse feed plane FP perpendicular to the cutting portion lateral axis F and intersecting the plurality of protuberances 84 (it is noted that the first raised region following the cutting edge 60 is part of the of the projection 74, specifically the forwardmost portion 76a thereof, and not one of the protuberances 84). It is seen that the plurality of protuberances 84 can follow a pattern of increasing height in a rearward direction $D_R$ away from the forward cutting portion surface 40.

As seen in FIG. 9, showing a cross-sectional view taken in a protuberance radial plane P2 perpendicular to one of the protuberance longitudinal axes PA and that intersects the protuberance 84, in accordance with some embodiments of the subject matter of the present application, each protuberance 84 can include two protuberance flank surfaces 84a and a central protuberance ridge surface 84b that extends therebetween in a widthwise direction of the protuberance 84. The protuberance ridge surface 84b can be higher than the two protuberance flank surfaces 84a in a widthwise cross-section.

FIG. 10 shows a cross sectional view taken in a protuberance axial plane P1 that contains one of the protuberance longitudinal axes PA and intersects the rake and relief surfaces 42, 44. In accordance with some embodiments of the subject matter of the present application, each protuberance 84 can include a protuberance lowest point LP. The protuberance lowest point LP can be spaced apart from the land 66. The protuberance lowest point LP can be vertically level with the cutting edge 52.

In accordance with some embodiments of the subject matter of the present application, each protuberance 84 can extend along a protuberance longitudinal axis PA. In a top view of the cutting portion 38, the protuberance longitudinal axes PA can be parallel with each other. The protuberance longitudinal axes PA may not be co-incident with a respective tangent line T. Each protuberance longitudinal axis PA can form a protuberance angle β with the cutting portion lateral axis F. The protuberance angle β can be in the range, 0°≤β≤30°. In this non-limiting example shown in the drawings, the protuberance angle β is equal to 0° (i.e. the protuberance longitudinal axis PA and the cutting portion lateral axis F are parallel to each other).

In accordance with some embodiments of the subject matter of the present application, in the protuberance axial plane P1, a central portion of the protuberance 84 can have a concave profile. The protuberance lowest point LP can be located at the concave profile. In the protuberance radial plane P2, a central portion of the protuberance 84 can have a convex profile.

Each protuberance 84 extends from the projection 74. By virtue of such a configuration the projection flank surface 74a closest the cutting edge 52 can undulate in the rearward direction $D_R$ away from the forward cutting portion surface 40.

Referring to FIG. 5, each protuberance 84 extends to the cutting edge 52. That is to say, each protuberance 84 terminates at the cutting edge 52. Thus, each protuberance 84 extends over (or via) the land 66. By virtue of such a configuration, the land 66 includes a plurality of spaced apart upwardly bulging land portions 86. Each pair of adjacent bulging land portions 86 are spaced apart by a non-bulging land portion 88. The land 66 has a land height H, measured in the upward direction $D_U$ from the rake plane P that varies along the cutting edge 52. Specifically, the land height H at each bulging land portion 86 defines a first land height $H_1$ that is greater than a second land height $H_2$ that is defined by the land height H at its adjacent non-bulging land portions 88. Each cutting edge crest 54 can be formed at a respective one of the bulging land portions 86.

Figure 6B:
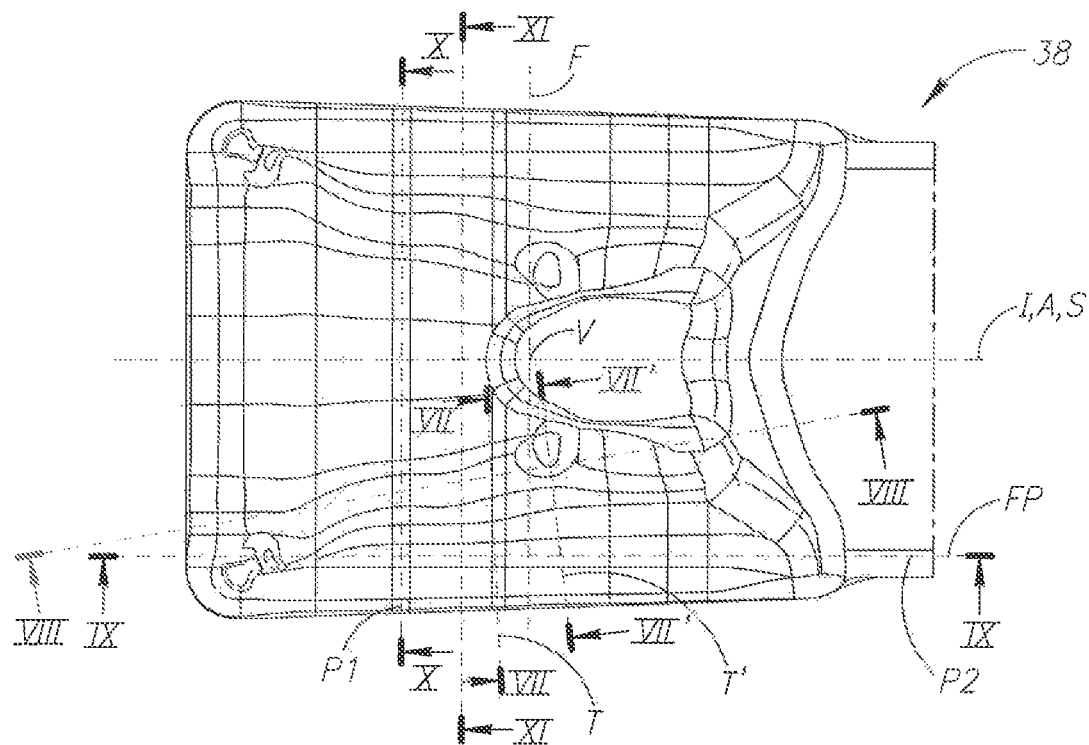
FIG. 6b is an analogous view to that shown in FIG. 6a, for the purpose of indicating cross-sectional lines.
Figure 7:
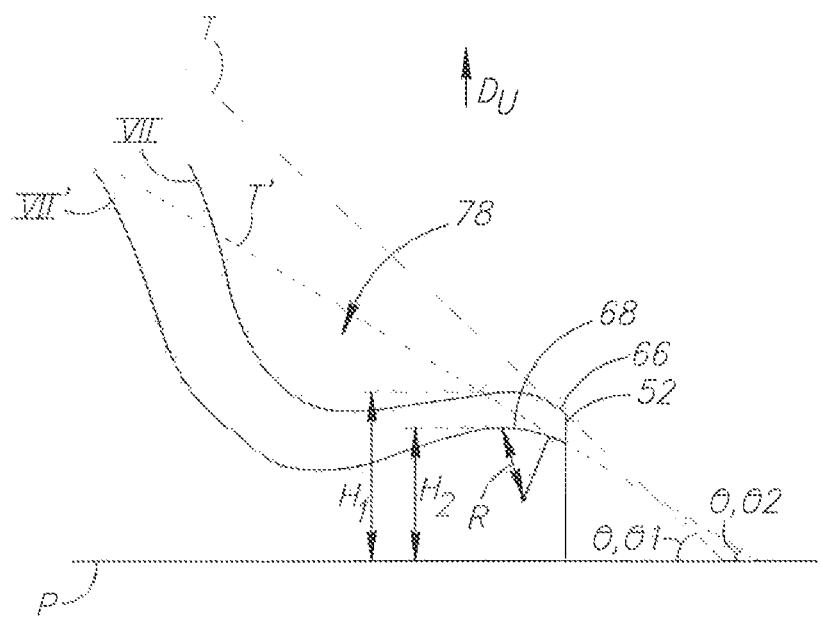
FIG. 7 is a schematic diagram showing the superimposed fragmentary cross sections taken along lines VII-VII and VII'-VII' in FIG. 6b.

Referring to FIG. 7, showing a schematic diagram having the superimposed fragmentary cross sections taken along lines VII-VII and VII'-VII' in FIG. 6b and also showing the two different tangent lines T, T' related to the respective cross sections, the land 66 (at both the bulging and non-bulging land portions 86, 88) can include a convexly curved land portion 68 that extends in the direction of the cutting edge 52. The convexly curved land portion 68 is also convexly curved in a direction away from the cutting edge 52. Thus, the land inclination angle θ at the convexly curved land portion 68 can decrease in a direction away from the cutting edge 52. The convexly curved land portion 68 can be spaced apart from the cutting edge 52. The convexly curved land portion 68 can be defined by a convexly curved land radius R. The convexly curved land radius R can vary along the cutting edge 56.

The land inclination angle θ at the cutting edge 52 at each of the bulging land portions 86 forms a bulging land inclination angle θ1. The land inclination angle θ at the cutting edge 52 at each of the non-bulging land portions 88 forms a non-bulging land inclination angle θ2. In accordance with some embodiments of the subject matter of the present application, the bulging land inclination angle θ1 at any given bulging land portion 86 can be greater than the non-bulging land inclination angles θ2 at its adjacent non-bulging land portions 88. Thus, as seen in FIG. 5, showing an imaginary extrapolated land surface 89 defined by the extrapolation of the land 66 at the cutting edge 52, the land inclination angle θ at the cutting edge 52 can vary in alternating increasing and decreasing fashion, along the cutting edge 52. The bulging land inclination angle θ1 at any given bulging land portion 86 can be greater than the non-bulging land inclination angles θ2 at its adjacent non-bulging land portions 88 by no more than 5°. The bulging land inclination angle θ1 can be in the range, 20°≤θ1≤40°. The non-bulging land inclination angle θ2 can be in the range, 5°≤θ2≤30°.

Generally speaking, the land 66 transitions into the chip forming groove 78 where the surface upon which it extends changes from a negative orientation to a positive orientation. However, it is noted that at the bulging land portions 86 the land 66 may not transition to a positive orientation.

In accordance with some embodiments of the subject matter of the present application, the chip-control arrangement 72 can include an elongated second projection 90. The second projection 90 can project from the rake surface 42. The second projection 90 can extend in a direction towards a forward portion of the cutting portion 38. The second projection 90 can be spaced apart from the second land 70.

In accordance with some embodiments of the subject matter of the present application, the chip-control arrangement 72 can include a plurality of elongated second protuberances 92. The plurality of second protuberances 92 can project from the rake surface 42. The plurality of second protuberances 92 can be spaced apart from each other and the forward cutting portion surface 40. Each second protuberance 92 can extend from the second projection 90 to the second cutting edge 58. Each second protuberance 92 can extend to the second cutting edge 58. Each second protuberance 92 can extend over (i.e. via) the second land 70. Thus, as seen in FIG. 2, the second land 70 can include a plurality of spaced apart second bulging land portions 94. The chip-control arrangement 72 can exhibit mirror symmetry about the symmetry plane S Similarly, the cutting portion 38 can exhibit mirror symmetry about the symmetry plane S.

It should be appreciated that any or all of the features relating to the relief surface 44, cutting portion corner 46, cutting edge 52, land 66, projection 74, protuberance 84 and bulging land portion 86 can apply to the second relief surface 48, second cutting portion corner 50, second cutting edge 58, second land 70, second projection 90, second protuberance 92 and second bulging land portion 94, respectively.

Figure 13:
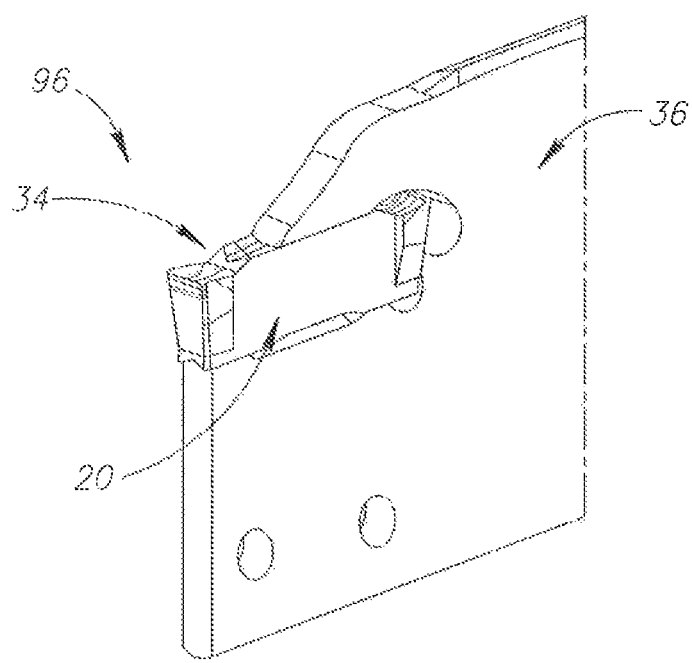
FIG. 13 is a perspective view of a cutting tool in accordance with the present application.

Referring to FIG. 13, a second aspect of the present application relates to a non-rotary cutting tool 96. For example, the cutting tool 96 can be designed for turning cutting operations as opposed to milling or drilling cutting operation. The cutting tool 96 includes a cutting insert 20 and an insert holder 36. The insert holder 36 includes an insert pocket 34, with the cutting insert 20 releasable retained in the insert pocket 34.

Figure 12:
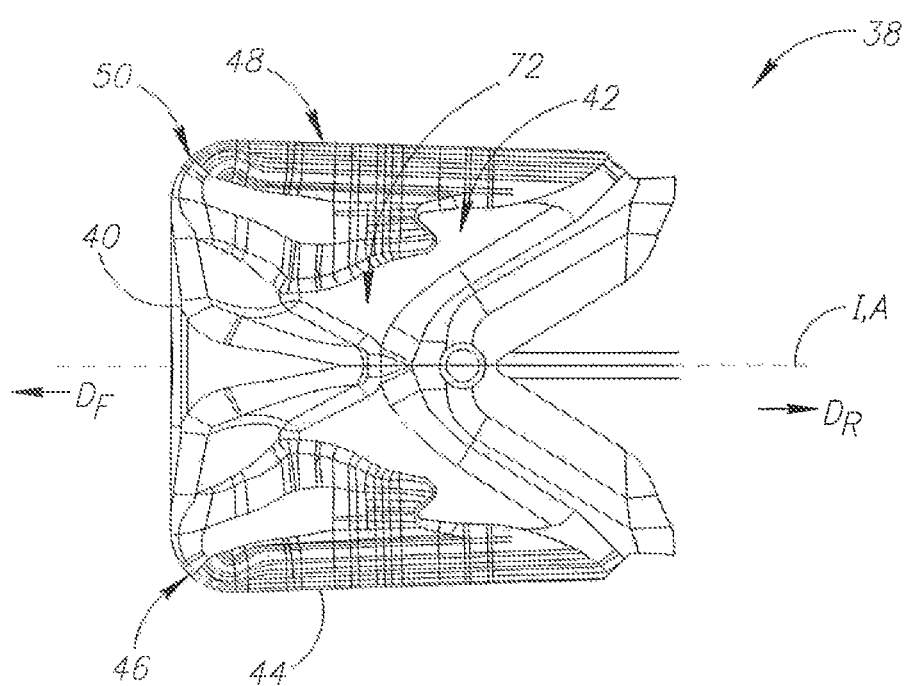
FIG. 12 is a top view of the cutting portion in accordance with a second embodiment of the present application.

Reference is now made to FIG. 12 showing a second embodiment. This embodiment has been found to work particularly well for grooving cutting inserts having a width (i.e. forward cutting edge length L) equal to 6 mm.

It should be noted that one feature of the subject matter of the present application is that the chip-control arrangement 72 has been found to be effective for turning and in particular groove-turning cutting methods.

It should be further noted that one feature of the subject matter of the present application is that the chip-control arrangement 72 has been found to be effective for cutting different metal work-piece materials such as steel, stainless steel and high temperature metal alloys, such as nickel.

It should be yet further noted that one feature of the subject matter of the present application is that the chip-control arrangement 72 has been found to be effective for multiple applications, such as full width grooving, partial (finish) grooving, finish turning, and turning.

Although the subject matter of the present application has been described to a certain degree of particularity, it should be understood that various alterations and modifications could be made without departing from the spirit or scope of the invention as hereinafter claimed.

What is claimed is:

1. A cutting insert (20) comprising:
a cutting portion (38), having a cutting portion major axis (A) defining opposite forward to rearward directions ($D_F$, $D_R$) and a cutting portion lateral axis (F), oriented perpendicular to the cutting portion major axis (A) in a top view of the cutting portion (38), defining a feed direction (D), the cutting portion (38) comprising:
a cutting portion corner (46) formed at the intersection of an upward facing rake surface (42), a forward facing forward cutting portion surface (40) and a relief surface (44) facing in the feed direction (D);
a cutting edge (52) formed at an intersection of the rake surface (42) and the relief surface (44);
a land (66) located on the rake surface (42) and extending along, and negatively away from, the cutting edge (52), defining a land inclination angle (θ) greater than 0°; and
a chip-control arrangement (72) at the rake surface (42) comprising:
an elongated projection (74) projecting from the rake surface (42), spaced apart from the land (66), and extending in a direction from a rearward portion towards a forward portion of the cutting portion (38); and
a plurality of elongated protuberances (84) projecting from the rake surface (42) and being spaced apart from each other and the forward cutting portion surface (40), each protuberance (84) extending from the projection (74) to the cutting edge (52), in such a manner that each protuberance (84) extends laterally fully across the land (66) and terminates at the cutting edge (52), so that the land (66) comprises a plurality of spaced apart upwardly bulging land portions (86).

2. A cutting insert (20) comprising:
a cutting portion (38), having a cutting portion major axis (A) defining opposite forward to rearward directions ($D_F$, $D_R$) and a cutting portion lateral axis (F), oriented perpendicular to the cutting portion major axis (A) in a top view of the cutting portion (38), defining a feed direction (D), the cutting portion (38) comprising:
a cutting portion corner (46) formed at the intersection of an upward facing rake surface (42), a forward facing forward cutting portion surface (40) and a relief surface (44) facing in the feed direction (D);
a cutting edge (52) formed at an intersection of the rake surface (42) and the relief surface (44);
a land (66) located on the rake surface (42) and extending along, and negatively away from, the cutting edge (52), defining a land inclination angle (θ) greater than 0°; and
a chip-control arrangement (72) at the rake surface (42) comprising:
an elongated projection (74) projecting from the rake surface (42), spaced apart from the land (66), and extending in a direction from a rearward portion towards a forward portion of the cutting portion (38); and
a plurality of elongated protuberances (84) projecting from the rake surface (42) and being spaced apart from each other and the forward cutting portion surface (40), each protuberance (84) extending from the projection (74) to the cutting edge (52) so that the land (66) comprises a plurality of spaced apart upwardly bulging land portions (86), and wherein:
each pair of adjacent bulging land portions (86) are spaced apart by a non-bulging land portion (88);
the land inclination angle (θ) at the cutting edge (52) at each of the bulging land portions (86) forms a bulging land inclination angle (θ1);
the land inclination angle (θ) at the cutting edge (52) at each of the non-bulging land portions (88) forms a non-bulging land inclination angle (θ2);
the bulging land inclination angle (θ1) at any given bulging land portion (86) is greater than the non-bulging land inclination angles (θ2) at its adjacent non-bulging land portions (88).

3. The cutting insert (20) according to claim 2, wherein the bulging land inclination angle (θ1) at any given bulging land portion (86) is greater than the non-bulging land inclination angles (θ2) at its adjacent non-bulging land portions (88) by no more than 5°.

4. The cutting insert (20) according to claim 2, wherein:
the bulging land inclination angle (θ1) is in the range, 20°≤(θ1)≤40°; and
the non-bulging land inclination angle (θ2) is in the range, 5°≤(θ2)≤30°.

5. The cutting insert (20) according to claim 2, wherein the bulging land inclination angles (θ1) follow a pattern of increasing value in direction away from the forward cutting portion surface (40).

6. The cutting insert (20) according to claim 1, wherein in a cross-sectional view taken in a transverse feed plane (FP) perpendicular to the cutting portion lateral axis (F) and intersecting the plurality of protuberances (84), the plurality of protuberances (84) follow a pattern of increasing height in a rearward direction ($D_R$) away from the forward cutting portion surface (40).

7. The cutting insert (20) according to claim 1, wherein the projection (74) is spaced apart from the land (66) by a chip forming groove (78) that undulates in the rearward direction ($D_R$) away from the forward cutting portion surface (40).

8. The cutting insert (20) according to claim 1, wherein the projection (74) increases in distance from the cutting edge (52) with increasing distance from the forward cutting portion surface (40).

9. The cutting insert (20) according to claim 1, wherein a forwardmost portion (76a) of the projection (74) extends in a direction towards the cutting portion corner (46).

10. The cutting insert (20) according to claim 1, wherein:
   a rearmost portion (76b) of the projection (74) extends longitudinally along a projection longitudinal axis (C);
   in a top view of the cutting portion (38), the projection longitudinal axis (C) forms a projection angle (α) with the cutting portion major axis (A); and
   the projection angle (α) is in the range, $5° \leq (α) \leq 15°$.

11. The cutting insert (20) according to claim 1, wherein:
   the projection (74) comprises two projection flank surfaces (74a) and a central disposed projection ridge surface (74b) that extends therebetween in a widthwise direction of the projection (74), the projection ridge surface (74b) being higher than the two projection flank surfaces (74a) in a widthwise cross-section.

12. The cutting insert (20) according to claim 11, wherein in a top view of the cutting portion (38), the projection ridge surface (74b) is located between the cutting portion major axis (A) and the cutting edge (52).

13. The cutting insert (20) according to claim 11, wherein in a top view of the cutting portion (38), the projection ridge surface (74b) transitions from being closer to the cutting edge (52) than to the cutting portion major axis (A), to being closer to the cutting portion major axis (A) than to the cutting edge (52), as the projection ridge surface (74b) extends in the rearward direction ($D_R$).

14. The cutting insert (20) according to claim 1, wherein:
   the projection ridge surface (74b) comprises a plurality of projection crest portions (80) and a plurality of projection trough portions (82), each adjacent pair of projection crest portions (80) being spaced apart by a respective projection trough portion (82), and each projection crest portion (80) being higher than its adjacent projection trough portions (82); and
   each protuberance (84) extends from a respective one of the projection crest portions (80).

15. The cutting insert (20) according to claim 14, wherein:
   the plurality of projection crest portions (80) follow a pattern of increasing height in a rearward direction ($D_R$) away from the forward cutting portion surface (40).

16. The cutting insert (20) according to claim 14, wherein the plurality of projection crest portions (80) are located above the cutting edge (52) as measured in an upward direction ($D_U$).

17. The cutting insert (20) according to claim 1, wherein:
   each protuberance (84) extends along a protuberance longitudinal axis (PA);
   in a top view of the cutting portion (38), each protuberance longitudinal axis (PA) forms a protuberance angle (β) with the cutting portion lateral axis (F); and
   the protuberance angle (β) is in the range, $0° \leq (β) \leq 30°$.

18. The cutting insert (20) according to claim 17, wherein in a top view of the cutting portion (38), the protuberance longitudinal axes (PA) are parallel with each other.

19. The cutting insert (20) according to claim 17, wherein in a cross-sectional view taken in a protuberance axial plane (P1) containing one of the protuberance longitudinal axes (PA) and intersecting the rake and relief surfaces (42, 44), a central portion of the protuberance (84) has a concave profile.

20. The cutting insert (20) according to claim 17, wherein in a cross-sectional view taken in a protuberance radial plane (P2) perpendicular to one of the protuberance longitudinal axis (PA) and intersecting the protuberance (84), a central portion of the protuberance (84) has a convex profile.

21. The cutting insert (20) according to claim 1, wherein in a side view of the cutting portion (38), the cutting edge (52) has a wavy profile, formed by a plurality of cutting edge crests (54) and at least one cutting edge trough (56), each cutting edge crest (54) being formed at a respective one of the bulging land portions (86).

22. The cutting insert (20) according to claim 1, wherein the land (66) comprises a convexly curved land portion (68) extending in the direction of the cutting edge (52) and that is convexly curved in direction away from the cutting edge (52).

23. The cutting insert (20) according to claim 1, wherein:
   the cutting portion lateral axis (F) defines a second feed direction ($D_2$), opposite the feed direction (D), the cutting portion (38) further comprising:
      a second cutting portion corner (50) formed at the intersection of the rake surface (42), the forward cutting portion surface (40) and a second relief surface (48) that faces in the second feed direction ($D_2$);
      a second cutting edge (58) formed at an intersection of the rake surface (42) and the second relief surface (48);
      a second land (70) located on the rake surface (42) and extending along, and negatively away from, the second cutting edge (58); wherein
         the chip-control arrangement (72) further comprises:
            an elongated second projection (90) projecting from the rake surface (42), spaced apart from the second land (70), and extending in a direction towards a forward portion of the cutting portion (38); and
            a plurality of elongated second protuberances (92) projecting from the rake surface (42) and being spaced apart from each other and the forward cutting portion surface (40), each second protuberance (92) extending from the second projection (90) to the second cutting edge (58), so that the second land (70) comprises a plurality of spaced apart second bulging land portions (94).

24. The cutting insert (20) according to claim 23, wherein the cutting portion (38) further comprises a forward cutting edge (60) formed at an intersection of the rake surface (42) and the forward cutting portion surface (40); and in a top view of the cutting portion (38), the forward cutting edge (60) has a forward cutting edge length (L) which also defines a maximum width dimension of the cutting insert (20) in a direction perpendicular to the cutting portion major axis (A).

25. The cutting insert (20) according to claim 23, wherein the chip-control arrangement (72) exhibits mirror symmetry about a symmetry plane (S) that contains the cutting portion major axis (A) and a cutting portion vertical axis (V) which is perpendicular to the cutting portion major axis (A) and which extends between the relief surface (44) and the second relief surface (48).

26. A non-rotary cutting tool (96), comprising:
a cutting insert (20) in accordance with claim 1; and
an insert holder (36) comprising an insert pocket (34); wherein:
the cutting insert (20) is releasably retained in the insert pocket (34).

\* \* \* \* \*